United States Patent [19]

Rubens

[11] 4,313,612
[45] Feb. 2, 1982

[54] CONVERTIBLE TRASH CONTAINER CARRIER

[76] Inventor: Robert A. Rubens, Rte. 4 Box 895, Sequim, Wash. 98382

[21] Appl. No.: 122,885

[22] Filed: Feb. 20, 1980

[51] Int. Cl.³ .............................................. B62B 3/02
[52] U.S. Cl. .............................. 280/79.1 A; 248/129; 248/DIG. 7; 280/47.35; 280/43.24; 280/408
[58] Field of Search ........... 280/79.1 A, 280/79.1 R, 79.2, 47.34, 47.12, 43.24, 43, 43.1, 47.19, 408; 211/71; 248/DIG. 7, 147, 129, 154; 16/29, 33

[56] References Cited

U.S. PATENT DOCUMENTS

| | | | |
|---|---|---|---|
| 1,676,381 | 7/1928 | Callison | 280/408 |
| 2,260,570 | 10/1941 | John | 248/DIG. 7 |
| 2,513,630 | 7/1950 | Elliott | 248/DIG. 7 |
| 2,834,608 | 5/1958 | Wixson | 280/43 |
| 3,224,595 | 12/1965 | Sherley | 248/DIG. 7 |
| 3,235,213 | 2/1966 | Hall | 248/DIG. 7 |
| 3,377,085 | 4/1968 | Fralick | 280/79.2 |
| 3,380,752 | 4/1968 | Goettl et al. | 280/43 |
| 3,463,502 | 8/1969 | Gough | 280/47.19 |

Primary Examiner—David M. Mitchell
Attorney, Agent, or Firm—William I. Beach

[57] ABSTRACT

A trash container carrier is convertible from a wheeled transporting to a ground supported structure. The carrier includes a wheel assemblage retractable within openings in the floor adjacent to the corners of the structure. A pair of upright members installed at opposite ends of the floor support a longitudinally extending arm. The arm rotatably connected to one member and freely supported by the other has a trash container lid secured to the underneath side. The lid is arranged to uncover a floor supported trash container when the arm is raised to load or unload the container.

23 Claims, 9 Drawing Figures

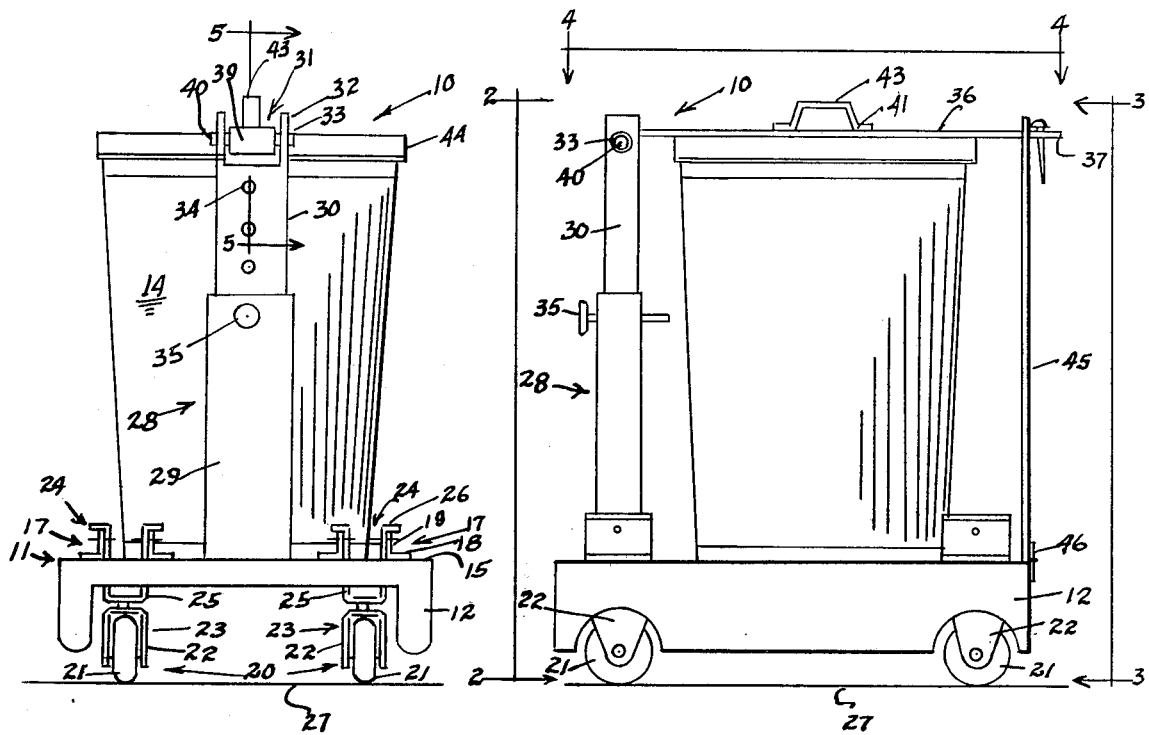
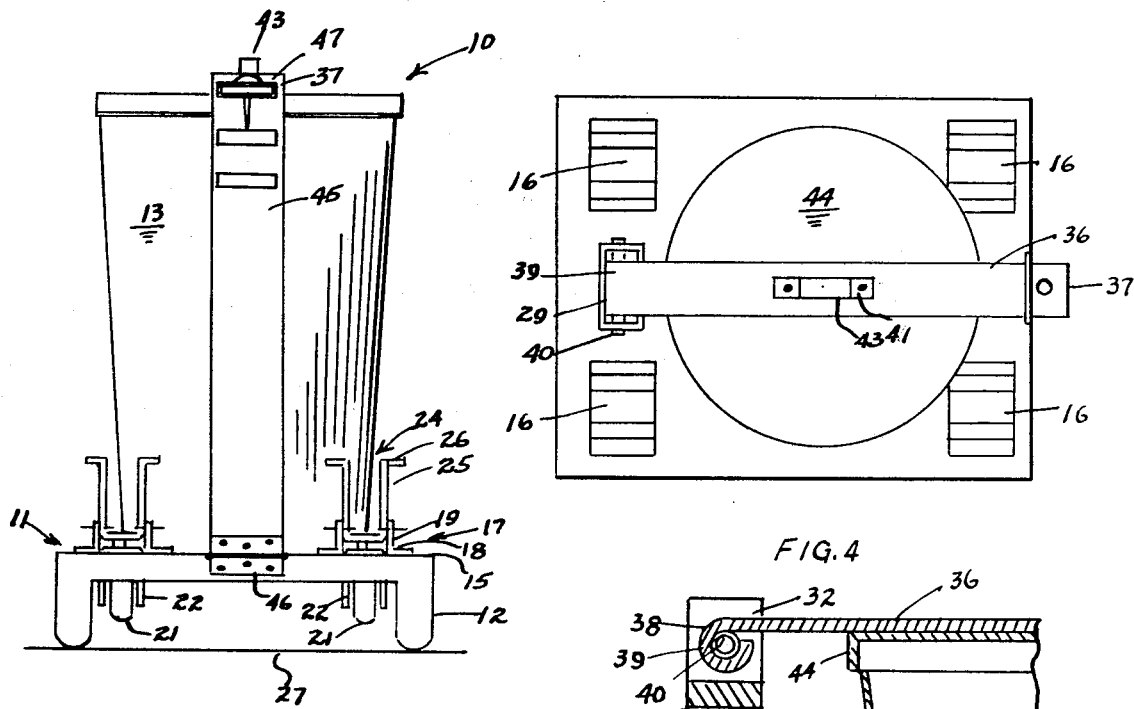

CONVERTIBLE TRASH CONTAINER CARRIER

BACKGROUND OF THE INVENTION

1. Field of the Invention

The present invention relates to hand manipulated trucks or dolly-like carts evolved to support and transport trash containers and the like to a place for trash and garbage pickup.

2. Description of the Prior Art

The conventional trash or garbage container is normally placed near the back door of residences, apartments, restaurants, stores and manufacturing facilities. With the exception of commercial and industrial usage where trucks equipped with front end lifts to upend large trash bins in the trucks most trash containers have to be hand carried. A heavy trash container is awkward for a man to carry and very difficult for a woman or youngster to carry to the alley or front curb for trash pickup. Furthermore, a hand carried trash can attracts dogs which frequently tip them over spreading garbage and refuse on the ground. This creates an unsightly mess to clean up. Sometimes the container and lid are tumbled in the alleyway and damaged by passing cars.

An efficient and lightweight trash container carrier is badly needed to serve the public. A search of the prior art disclosed that although several carts and the like have been devised few, if any, apparently lacked sufficient utility or market appeal to be produced and sold. Several are discussed here to point out some of the problems noted in construction and operation.

A cart for lidded cans is shown in U.S. Pat. No. 3,907,117 issued to Robert J. Williams. This device claims a wheeled support for several trash containers with hand removable lids. A longitudinally extending hold-down bar is pivotally suspended from two upright members stationed at the opposite ends of the cart. The hold-down bar stretches over the tops of the lid covered cans and by virtue of the aid of gravity holds the cans down on separated floor plates which have side flanges to hold the cans from sliding laterally but not any stops from sliding fore and aft. There are several features inherent in Williams' device which can create problems. In the first place a hold-down bar as described without sufficient means to keep it from bouncing up and down when the cart is wheeled over bumpy ground could be troublesome. For example, if the hold-down bar bounces and releases pressure from the lids the containers can slide off the plates in a longitudinal direction and together with a rocking motion induced by bumps may well slide laterally and tip over.

Hand removed lids are another problem. When the trash collector empties the container it is necessary to lift the hold-down bar and separate each lid from the container. The lid then is set or tossed aside and the container emptied. In returning the containers to the cart the lids may not be placed back on top of the containers. Thus, they are left laying in or along side an alley or curb and are often lost or damaged.

Another trash can holder is disclosed in U.S. Pat. No. 3,292,795 to J. W. Chappell. This device is a wheelbarrow type cart constructed of formed tubing. The frame is supported on two front wheels and the two rearwardly extending legs. The holder supports two trash cans and covering lids secured to a pair of opposite swinging arms rotatably supported to upright members fastened at each end of the holder. A hand-lifted and wheeled holder as disclosed by Chappell with two containers heavily loaded would certainly tax the strength of a woman. It is doubtful that she could lift the rear end or at best wheel the holder very far. Another part of the holder which is awkward to control is the rearward extending handle. The handle projects from the rear centrally mounted upright. To lift and push the holder a person has to grasp it with both hands and push from the front part of his body which is a difficult way to handle a wheelbarrow type of holder. Another disadvantage is that in placing the containers in the framework of the holder there is no device available to position the container so that it will rest in place for closure relative to the fixed position of the lid on the rotating arm except by manual movement. It appears that when the lid is lowered the container has to be moved directly under the descending lid; otherwise there is no means for registry of the two parts.

U.S. Pat. No. 3,235,213 issued to W. E. Hall discloses a wheeled truck or dolly on which are two trash containers placed at random settings on the floor. Similar to the prior references an upright member is installed on the rear and front end of the truck. An arm having one end fastened to the handle of a lid has the other end portion connected to a closed channel guide or track. An arm is slidably and rotatably connected to each upright by means of a bolt loosely engaged in the track and transversely connected to spaced apart flanges secured to each upright. In operation the action of the lid-connected arm is the reverse of the arm motion described for the Chappell device. Here the arm can be slid fore and aft and rotated vertically to place the lid on the top of the container. In both devices the effort to close a container with a lid is time consuming.

Although a novelty search disclosed other forms of trash container holders most, more or less, displayed similar features described in the above references.

In light of the above references it is the object of the present invention to provide a convertible trash container carrier that can be loaded, transported and unloaded with little effort. When unloading the lid can be automatically and quickly lifted upon raising an arm, the container removed and emptied, then replaced in a shallow recessed seat and the arm lowered to place the lid squarely upon the top of the container. Since the container and covering lid remain together on the carrier before loading and after unloading neither becomes separated, lost, damaged or tipped over by dogs. More importantly, the wheels can be retracted to set the side rails upon the ground for stationary positioning or in the region where snow is a problem the carrier can be hauled with the side rails becoming sled runners to a place of trash disposal.

SUMMARY OF THE INVENTION

In carrying out the principles of the present invention in accordance with a preferred embodiment thereof, a convertible trash container carrier comprises a pallet for supporting a trash container and lid, a top surface, front and rear end, a pair of downwardly projecting side rails and a small opening through the floor of the pallet located adjacent to each corner. A wheel assemblage is secured to the sides of each opening to support the pallet above the ground surface. Included are connecting means adapted to removably mount the wheel assemblage inside of the openings. There is a first upright member secured at a lower end to the top surface adjacent the rear end of the pallet intermediate of the side rails. The upper end of the member has a cut-out area for a rotatable connection. An arm extending along the longitudinal axis of the top surface has an inner end formed for rotational communication with the upper end of the first upright member. The arm further includes a pair of spaced holes through the arm intermediate of the inner and outer ends. Connecting means are available for attaching the lid to the arm at the spaced holes. Further, hinge means are adapted to rotate the inner end of the arm about the cut-out area in the upper end of the first upright member. Completing the structure, a second upright member is rotatably fastened to the front end in alignment with the first member and has an opening adjacent to the top end so as to receive a portion of the outer end of the arm therethrough in locking engagement.

BRIEF DESCRIPTION OF THE DRAWING

FIG. 1 is a side elevational view of the structural framework of the present invention, FIG. 2 is a rear elevational view of FIG. 1 taken along line 2—2 showing the wheel assemblage secured to the carrier, FIG. 3 is a front elevational view taken along line 3—3 showing the wheel assemblage retracted and the side rails lowered in contact with a ground surface, FIG. 4 is a top plan view taken along line 4—4 showing the wheel well openings, FIG. 5 is an enlarged fragmentary side view taken along line 5—5 in FIG. 2 showing the details of the rotatable connection of the inner end of the arm to the upper end of the first upright member.

DETAILED DESCRIPTION OF THE PRESENT INVENTION

Figure 6:
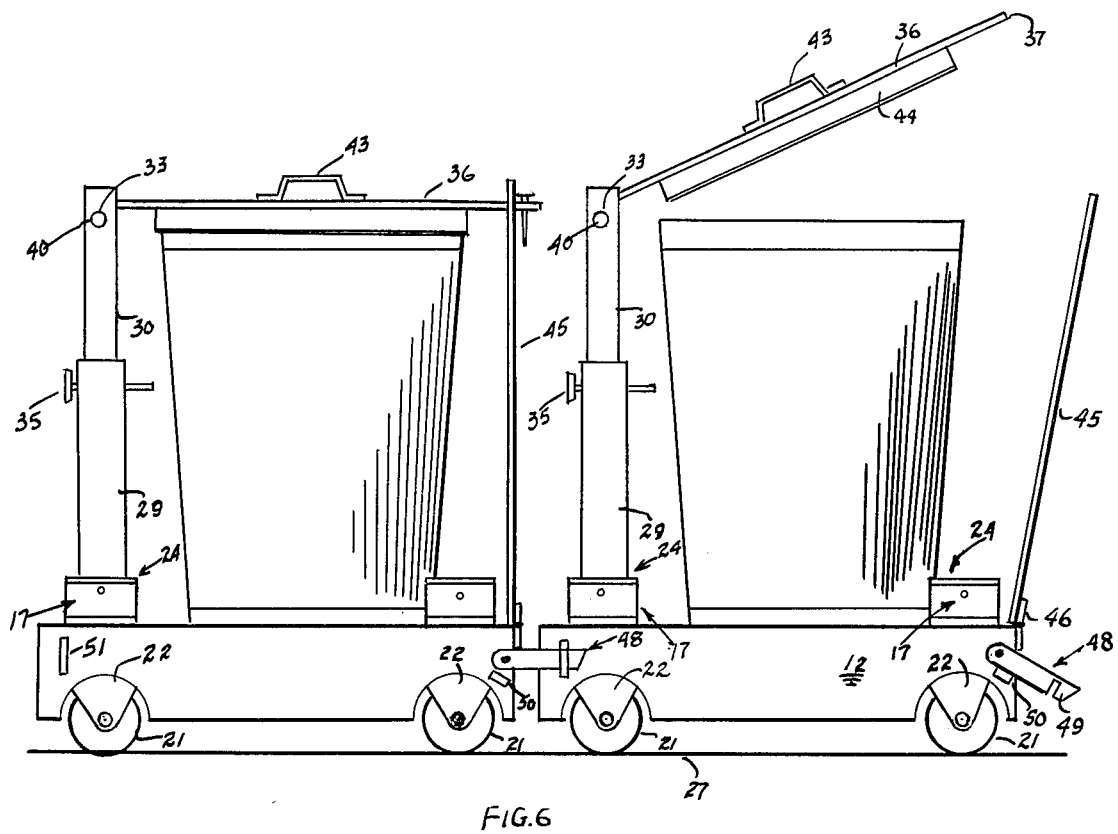
FIG. 6 is a side elevational view of a modified version of FIG. 1 showing a coupling arrangement connecting two carriers together in tandem.

Referring to FIG. 1 through 6 it can be seen that a wheel carrier 10 for transporting a trash container comprises a pallet 11 connected to a pair of side rails 12—12 and including a front end 13, rear end 14 and a top surface or floor 15. Extending through the floor 15 are four corner located wheel-well openings 16. An L-shaped member 17 has a horizontal leg 18 fastened to floor 15 on the opposite longitudinal sides of each opening 16 and a vertical leg 19 extending upwardly from the side edges. Within each opening is a wheel assemblage 20 comprising a wheel 21 rotatably mounted between a pair of side flanges 22—22 of a lower inverted channel 23. Channel 23 is rotatably connected to an upright channel 24 which also has a pair of side flanges 25—25 fastened to the spaced vertical leg 19 of L-shaped member 17. The upper end of side flanges 25—25 has opposite extending right angle shoulders 26—26 bearing down on the upper longitudinal edge of vertical leg 19. In addition to the matching hole in side flanges 25 and vertical leg 19 fastening them together there are several more selective holes in the side flanges available for raising wheel assemblage within opening 16 and fastening to vertical leg 19 when retracting from engagement with a ground surface. Referring to FIG. 3 it can be seen that the wheel assemblage 20 is retracted and that the side rails 12—12 are resting on a ground surface 27. The unique arrangement for retracting the wheel assemblage provides the means for converting a wheeled carrier for transportation to a ground supported unit which is more or less a stationary holder of a trash container. It is important to point out that the side rails can become sled runners in various regions covered with snow and ice. With the carrier now converted to trash carrying sled it can be towed in deep snow whereas it would be very difficult to pull a carrier with wheels buried in the snow. Although it would be preferable to simply retract the wheel assemblage in most situations it is pointed out that the assemblage can be easily removed from the carrier if required.

Another feature important to discuss is that the floor has a shallow concave seat to hold and prevent the trash container from sliding around on the pallet floor. The seat has a sloping side which guides the seating of the container into a set position with regard to closure with a lid which will be discussed in detail later.

Secured to the rear end 14 of pallet 11 is a first upright member 28 which has a lower portion 29 comprising a rectangular tube firmly secured to floor 15 intermediate side rails 12—12. A flat sided beam 30 is slidably contained within the lower portion 29 and provides an upper end cut-out area 31. The cutout extends downwardly from the distal transverse edge for a distance sufficient to provide rotational space for an arm described later and a width less than the width of beam 30 to leave spaced apart upstanding side portions 32—32 of the beam on both sides of the cut-out area. A transverse hole 33—33 extends through side portions 32—32 of the beam and several vertically spaced holes 34 extend through beam 30 below the cut-out area which may be fastened to a matching hole in the lower portion 29 when needed to lower the beam. A pin 35 is used to fasten beam and lower portion of first upright member together.

A longitudinally extending arm 36 has an outer end 37 and an inner end 38 formed into a transverse semi-circular tube 39. The tube has a transverse central axis which, when installed within the cut-out area 31 of beam 30, lays directly in the central transverse plane of first upright member 28. A rod 40 extends through holes 33—33 and semi-circular tube 39 to rotatably connect arm 36 to beam 30. A pair of spaced holes 41—41 extends through arm 36 approximately intermediate its outer and inner ends and another hole 42 extends through the outer end 37. A handle 43 is detached from lid 44 and installed with its flange holes in registry with holes 41—41. Lid 44 is fastened underneath arm 36 through the holes left open upon removal of the handle in alignment with holes in the arm 36 and handle 43.

A second upright member 45 has a bottom and rotatably connected to floor 15 adjacent to front end 13 with hinge 46. The second upright is positioned in alignment with the first upright member 28 along the longitudinal axis of pallet 11. A slotted transverse opening 47 extends through the top end of member 45 through which outer end 37 is received when arm 36 is lowered to close the top of the container with lid 44. It is important here to describe the action of the arm relative to its rotational connection with the upper end of first upright member 28 and the closing of the container with lid 44. Inasmuch as the lid must be horizontally level with the top of the container at the moment of closing the arm must be positioned so that when swinging downwardly the angle of rotation does not present a canted angle of approach of the lid. For this reason it has been observed that in other types of trash container carts or holders the axis of rotation of the arm is coveniently established above the top level of the container. Nevertheless, the present invention deviates from this method in the interest of achieving efficiency of structural design and cost by establishing the axis of rotation in a horizontal plane passing over the open edge of the container. FIG. 5 is presented to illustrate the rotational connection of arm 36 within the upper end cut-out area 31 of first upright member 28. In this view the inside circumference of the tube end 39 of arm 36 rotates about the outside circumference of rod 40 which, as previously mentioned, fastens the arm to the side portions 32—32 of beam 30. From experiments it was found that with this combination the lid closed easily over the top of the container when the center of rotation of the rod and the tube lay in a horizontal plane level with the top of the uncovered container.

FIG. 6 shows a coupler attached to the sides of the pallet to increase its utility. The coupler 48 comprises a hook-like latching bar 49 rotatably fastened at the front end 13 of side rails 12—12. A stop 50 is positioned below the latching bar. On the rear end 14 of the side rails is fastened a slotted lug 51 adapted to engage the mouth of bar 49 when two or more carriers are coupled together in tandem order. Although it is preferable to attach coupler 48 on the side rails as shown it could be installed on the floor intermediate of the side rails. This is an added average when several carriers are needed at different locations and when loaded can be hooked together for transporting to a place for trash pickup. FIG. 6 shows a typical coupling of two carriers.

Figure 7:
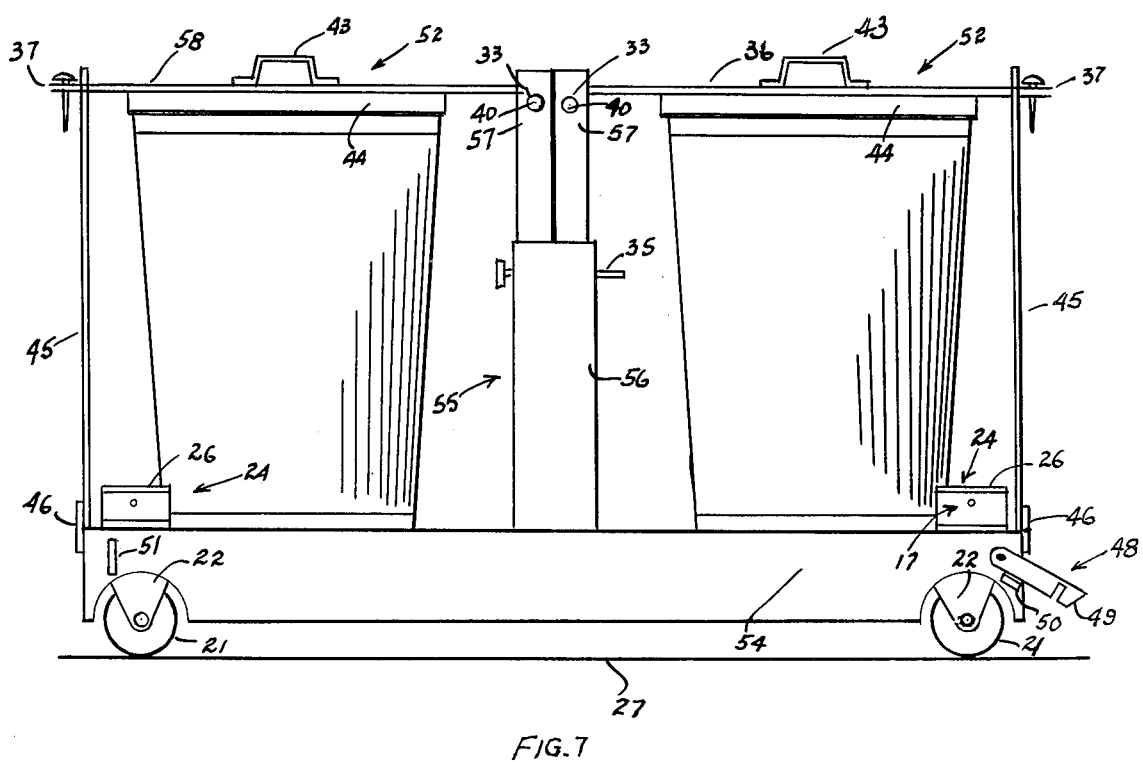
FIG. 7 is a side elevational view of a second modified version showing an enlarged carrier for supporting a plurality of containers adapted to function in the same way as the carrier in FIG. 6.
Figure 8:
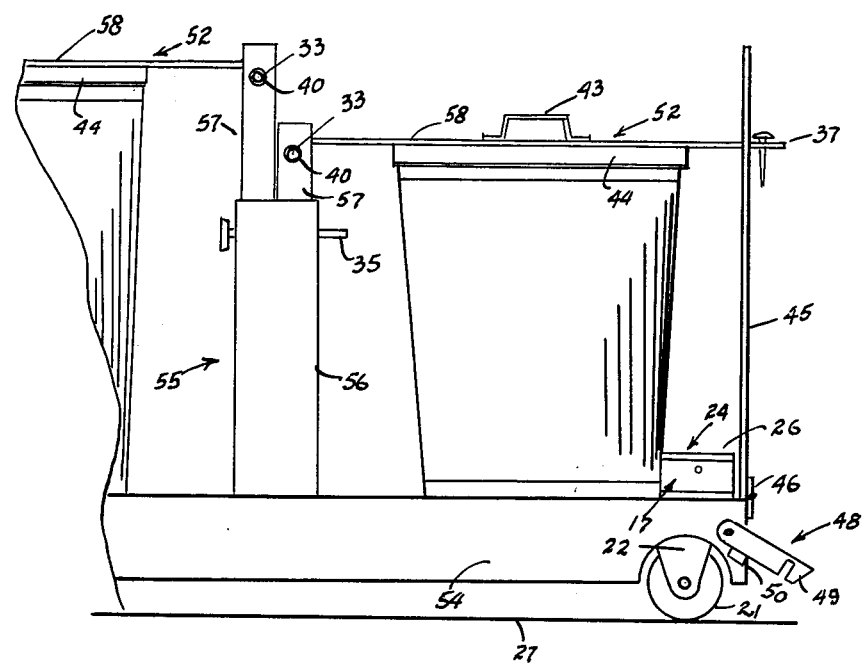
FIG. 8 is a partial elevational view of FIG. 7 showing the position of the arms holding down containers of different heights.
Figure 9:
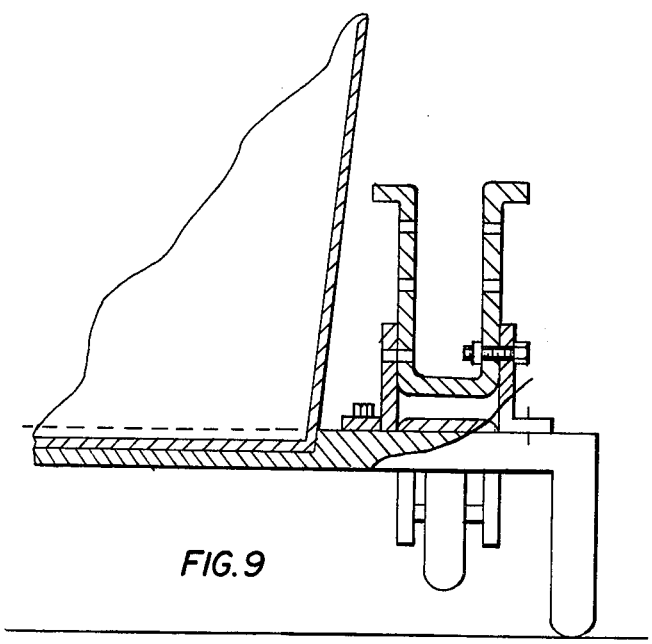
FIG. 9 is a partial elevational view of the attachment holes in the upper channel flanges and legs of the L-shaped devices and concave seat of the container in the pallet.

A modified version of the carrier 52 is shown in FIG. 7 and FIG. 8. This is an elongated structure for carrying at least two trash containers. The elongated pallet or platform 53 has a pair of elongated side rails 54—54 similar to that shown in FIG. 1 through FIG. 6. The openings in the floor along with the L-shaped devices and wheel assemblage are the same as the prior characters 16, 17 and 20. The upright members mounted on opposite ends of platform are the same as the second upright member 45 illustrated in the aforementioned figures. The upright member 55 mounted intermediate of the two end upright members is essentially the same as the first upright member 28 discussed above except that the lower portion 56 is enlarged to contain two beams 57—57 slidably housed within the bottom portion and each have the same cut-out areas 31 in their upper end and line of vertical holes 34 extending through beams 57—57. The pair of longitudinal arms 58—58 is the same as arm 36 except that each arm extends in opposite direction from a rotatable connection within the cut-out area of beams 57—57. The pair of arms has the same identically formed tube ends previously noted as 39 and are connected to the upper end of beams 56—56 with rod 40. The attachment of lid 44 to arms 58—58 is the same and each has an outer end engaged with the slotted opening in the top portion of the second upright member 45 disposed at opposite ends of platform 53. The coupler 48 as shown in FIG. 6 is installed on carrier 52 which will provide the means to connect two or more carriers in tandem arrangement. Carrier 52 can also be lowered with side rails 54—54 in contact with a ground surface when desired.

The construction of the present invention lends itself readily for loading, transporting and unloading a trash container. Upon loading the second upright member is disengaged from the arm and the arm raised to a vertical position to thereby remove the lid from the container. When loaded the arm is lowered to replace the lid on the container and the second upright member lowered for a towing handle.

Hand gripping means is provided in the handle between the distal top edge and the lower slotted opening through which the fingers can extend when pulling or transporting the carrier for trash pickup.

When unloading the arm is again raised to uncover the container whereupon it is removed, emptied and placed back in the seat recessed in the floor of the pallet. The arm is lowered until the lid covers the top of the container and the outer end received in the slotted opening at the top end of the second upright member.

From the description and illustration of the present invention it is obvious that it provides important advantages which can be used effectively and efficiently to eliminate most of the problems present in the handling and disposing of trash and garbage.

The foregoing description is to be clearly understood to be given by way of illustration and example only, the spirit and scope of the present invention being limited solely by the appended claims.

I claim:

1. A trash container carrier, which comprises:
    a pallet for supporting a trash container and lid having a top surface, front and rear end, a rail projecting downwardly from the sides and a small opening extending through the floor of the pallet adjacent to each corner,
    a wheel assemblage secured to the longitudinal sides of each opening for supporting said pallet above a ground surface,
    connecting means adapted to removably mount the wheel assemblage inside said opening,
    a first upright member secured at a lower end to the floor adjacent of the rear end of said pallet intermediate of the side rails and having an upper end area cut-out for a rotatable connection,
    an arm extending along the longitudinal axis of said floor having an inner end formed for rotatable communication with the upper end of the first upright member, and including a pair of spaced apart holes through the arm intermediate the inner and outer ends,
    connecting means for attaching the lid to the holes in said arm,
    hinge means adapted to rotate said inner end of said arm about the cut-out area in said upper end of said first member,
    a second upright member rotatably fastened at a bottom end to said floor adjacent to said front end in alignment with said first member and having an opening adjacent to the top end to receive a portion of the outer end of said arm therethrough in locking engagement.

2. A trash container carrier as recited in claim 1, wherein:
    said pallet further includes an L-shaped device having a vertical leg and a horizontal leg attached to said top surface on both sides of said opening.

3. A trash container carrier as recited in claim 2, wherein:

the wheel assemblage comprises a dolly-like wheel disposed between the downwardly side flanges of a lower inverted channel, the wheel being rotatably mounted on an axle extending through centrally positioned openings in the flanges and wheel, and an upper channel rotatably connected to the lower channel having upwardly standing flanges fastened to the vertical leg of the L-shaped device on both sides of each opening.

4. A trash container carrier as recited in claim 3, wherein:

the connecting means adapted to removably mount the said wheel assemblage comprises having the upper channel upwardly standing flanges placed adjacent to the vertical legs of the spaced apart L-shaped devices at each opening and fastened together.

5. A trash container carrier as recited in claim 1, wherein:

the connecting means for attaching the lid to said arm comprises a hat-shaped handle having holes in the opposed flanges aligned with the spaced apart holes in said arm and then connected to said arm and lid suspended directly underneath said holes.

6. A trash container carrier as recited in claim 1, wherein:

the hinge means comprises having the inner end of said arm formed into a semicircular tube and rotatably connected to said first upright member in the upper end cut-out area so that the axis of rotation coincides with the central transverse plane of said first member.

7. A trash container carrier, which comprises:

a platform for supporting at least one trash container and lid having a top surface, front and rear end, a downwardly extending rail secured to the sides, a rectangular opening passage through the floor of the platform adjacent to each corner, the longitudinal sides of the passages being reinforced with an L-shaped device having a vertical leg and a horizontal leg fastened to the top surface, the device further having at least one hole in the vertical leg, a wheel assemblage mounted within each of said passages adapted to support said platform in rolling contact with a ground surface, connecting means for detachably installing the wheel assemblage within each of said passages, a first upright member having a lower hollow end portion mounted on said floor intermediate of said sides adjacent to the rear end of said platform, and an upper solid beam portion slidably housed within the lower portion having an upper end area cut-out for a rotatable connection, a longitudinally stretching arm having an inner end formed into a semi-circular tube for a rotatable connection in the upper end cut-out area of the solid beam portion of the first upright member and including a pair of holes extending through the arm intermediate of the outer and inner end, connecting means adapted to fasten the lid to the holes in said arm so that when in rotational operation said lid encloses the open end of the trash container, hinge means adapted to couple the semi-circular tube end of said arm to the upper end cut-out area of the solid beam portion in cooperative rotation about the central transverse plane of said first member, a second upright member having a bottom end rotatably secured to said top surface adjacent to the front end of said platform in alignment with said first upright member including a slotted opening in the top end for receiving a portion of the outer end of said arm in locking engagement.

8. A trash container carrier as recited in claim 7, wherein:

said platform further includes a shallow concave area formed in said floor having an inwardly sloping side for receiving the bottom of said trash container.

9. A trash container carrier as recited in claim 7, wherein:

the wheel assemblage comprises a dolly-like wheel assembled between the downwardly projecting side walls of an inverted channel on an axle extending through centrally located holes in the walls of the channel and wheel, and an upright channel having a base portion rotatably fastened to a similar portion of the inverted channel, the upper free ends of the upright channel side walls being formed in opposite extending right angle flanges for bearing on the edge of the vertical leg of the L-shaped device, the upright channel side walls and vertical legs of said L-shaped device being in side by side contact for adjustable fastening together.

10. A trash container carrier as recited in claim 9 wherein:

the connecting means for detachably installing the wheel assemblage within each of said passages comprises having said side walls of said upright channel secured to said vertical legs of said L-shaped device with a fastener and when required to detach said assemblage the fastener is withdrawn to allow said platform to be lowered until said side rails rest upon the ground surface.

11. A trash container carrier as recited in claim 7, wherein:

said hollow lower portion of said first upright is adapted to slidably support within, the upper solid beam having outside dimensions equal to the inside space of said lower portion and the upper end of said beam being shaped with an area cut-out between the sides of said beam arranged to receive the semicircular rolled end of said arm for a rotatable connection and further said lower portion and said upper beam have a plurality of vertically aligned holes bored through their walls so as to permit said beam to be lowered and refastened to said lower portion when said arm is moved downwardly to apply said lid on a trash container of lesser height.

12. A trash container carrier as recited in claim 7, wherein:

said arm further includes a hole through the portion of said outer end extending through the slotted opening in the top end of the second upright member, and a tapered plug inserted in the hole to lock said arm and second upright together.

13. A trash container carrier as recited in claim 7, wherein:

the connecting means for securing said lid to said arm comprises a handle removed from said lid placed so that the handle holes in the right angle flanges are positioned directly over the holes in said arm and said lid being disposed underneath with open holes in alignment with said handle and arm, then fastened thereto with a fastener.

14. A trash container carrier as recited in claim 11, wherein:

the hinge means provides rotational communication between the inner tubular end of said arm installed in the space left by said cut-out area in said upper end of said beam, said tubular end being positioned with the transverse axis in alignment with the central transverse plane of said beam and rotatably secured thereto with an inserted rod extending through said tubular end and upper end of said beam.

15. A trash container carrier as recited in claim 7, wherein:

said platform further includes a coupler fastened to said sides of said platform comprising a latching bar having one end rotatably fastened to said front end of said platform and the other end formed in a general shape of a hook, and a slotted lug fixedly fastened to said rear end adapted to couple with the coupler mounted on another trash container carrier so as to tow a plurality of such carriers in tandem arrangement.

16. In a trash container carrier, which comprises:

an elongated platform for supporting a plurality of trash containers and lids having a top surface, opposite ends, a pair of downwardly extending side rails, a plurality of cup-like seats impressed in the top surface for receiving the bottom rim of the trash container and a rectangular opening extending through the floor of the platform located at each corner, an L-shaped member having a vertical leg and a horizontal leg fastened on both sides of the openings parallel to the side rails having at least one hole in the vertical leg, a wheel assemblage mounted within said openings having an upper part adjustably secured to said top surface and adapted to rotatably support said platform on a ground surface, connecting means arranged to detachably install the wheel assemblage within said openings and provide a selective line of fastening holes in the upper part for raising or lowering said platform, a first upright member comprising a lower hollow rectangular portion centrally secured on said top surface having slidably contained within a pair of rectangular flat sided beams movable with respect to the other, the top of the beams being shaped to provide a cut-out area in the transverse sides for a rotatable connection, a pair of longitudinal extending arms having inner ends of rectangular cross section formed into a semicircular tube adapted for rotatable connection in the upper end cut-out area formed in the pair of rectangular beams, the arms being extended in opposite directions from the centrally disposed first upright member further include a pair of spaced apart holes intermediate of the opposite ends, connecting means adapted to attach the trash container lids to the holes in the bottom side of said arms in alignment with the top of said trash containers, hinge means arranged to rotate said arm singly in independent movement about the cut-out area in said centrally disposed upright member so as to enclose the top of said trash containers with said lids, and a pair of second upright members having a bottom end of each member being hinged to said top surface at opposite ends of said platform in longitudinal alignment with said centrally disposed first upright member, and the top ends being slotted for an opening for receiving the outer ends of said arms for locking engagement.

17. In a trash container carrier as recited in claim 16, wherein:

the wheel assemblage comprises a dolly-like wheel rotatably suspended between the downwardly stretching flanges of an inverted U-shaped frame on an axle positioned through the bore centrally disposed in the web of said wheel and spaced apart flanges, and an upright U-shaped frame having upwardly stretching flanges engaging said vertical legs of the L-shaped member and the upper ends being formed in opposite right angle shoulders bearing on the top ends of said member, the flanges and said legs further having a plurality of vertically aligned fastening holes for setting a height adjustment of said wheel assemblage with respect to relative position of said side rails and ground surface.

18. In a trash container carrier as recited in claim 17, wherein:

the connecting means arranged to detachably install said wheel assemblage within said openings comprises said flanges and vertical legs of said upright frame and L-shaped member being joined together in a set of matching holes while said platform remains held a distance above said ground surface to prepare the carrier for wheeled transportation and then when required unfasten said flanges and legs to allow said platform to sink over said wheel assemblages until said side rails rest on said ground surface.

19. In a trash container carrier as recited in claim 16, wherein:

the pair of said rectangular beams has parallel areas cut-out in their upper ends from the horizontal edge downwardly to a relatively small depth with respect to the length of said first upright member and for a width less than the width of said beams to provide a space between the standing side portions left by said cut-out the standing side portions being bored with a transverse hole through both portions and further include a plurality of vertically aligned holes extending through the wall of said beams in registry with a similar set of holes through the walls of said lower hollow rectangular portion whereby said upper beams can be moved selectively downward and fastened within and to said hollow portion when required to cover a trash container less than one of standard height.

20. In a trash container carrier as recited in claim 19, wherein:

the said pair of arms having inner ends formed into semi-circular tubes is positioned in said cut-out space located in the upper end of said beams so that the transverse axis of said tubes lays directly over the central transverse plane of said beams.

21. In a trash container carrier as recited in claim 20, wherein:

the connecting means for attaching said trash container lids to said arms comprises a handle removed from said lids disposed in alignment with the holes extending through said arms and said lid being placed with the handle removed holes beneath said arms in line with the aforementioned holes and fastened with a suitable fastener to secure said handles, arms and lids together.

22. In a trash container carrier as recited in claim 20, wherein:

the hinge means comprises said tube end of said arms being inserted in the space between said standing side portions of said beams so that the transverse axis of said arms coincide with the transverse central plane in said beams, the axis of said tube then being approximately level with the top of said trash container with lid removed and a rod inserted through the holes in the standing side portions of said beams and through said tubes to rotatably connect said arms to said beams, the diameter of the rods being a close fit to the inside of said tubes but a substantially loose fit in the holes in said standing side portions.

23. In a trash container carrier as recited in claim 16, wherein:

said elongated platform further includes a coupler comprising a bar having one end rotatably connected to said side rails adjacent to an end of said platform and the other end formed into a hook portion, and a slotted lug extending from said sides at the other end of said platform having a slotted opening adjacent to the outer end to receive the mouth end of said hook therein, whereby having a similar coupler on another of said trash container carrier will allow the two to be coupled and towed to a place of trash disposal.

* * * * *